(12) United States Patent  (10) Patent No.: US 7,553,411 B2
Huehn et al.  (45) Date of Patent: Jun. 30, 2009

(54) FILTER CARTRIDGE

(75) Inventors: Barry Huehn, Blacksburg, VA (US);
Jeffrey Warden, Raleigh, NC (US);
Joseph Roark, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 158 days.

(21) Appl. No.: 11/645,225

(22) Filed: Dec. 22, 2006

(65) Prior Publication Data

US 2008/0149545 A1    Jun. 26, 2008

(51) Int. Cl.
*A01K 63/04* (2006.01)
*B01D 27/14* (2006.01)
*B01D 29/58* (2006.01)

(52) U.S. Cl. .................. 210/167.21; 119/259

(58) Field of Classification Search ............ 210/167.21, 210/167.22, 167.25, 167.27, 486, 488; 119/259, 119/260

See application file for complete search history.

(56) References Cited

U.S. PATENT DOCUMENTS

| | | | | |
|---|---|---|---|---|
| 3,398,836 A | * | 8/1968 | Hugentobler | 210/455 |
| 3,526,323 A | * | 9/1970 | Smith | 210/460 |
| 4,894,151 A | | 1/1990 | Woltmann | |
| 5,053,125 A | * | 10/1991 | Willinger et al. | 210/167.22 |
| 5,164,089 A | * | 11/1992 | Preston | 210/615 |
| 5,630,940 A | * | 5/1997 | Van Rossen et al. | 210/484 |
| 6,692,637 B2 | * | 2/2004 | Fox et al. | 210/167.22 |
| 7,416,659 B2 | * | 8/2008 | Newman | 210/167.27 |
| 2003/0085167 A1 | | 5/2003 | Fox | |

FOREIGN PATENT DOCUMENTS

WO    WO 2004/052091 A    6/2004

OTHER PUBLICATIONS

*Prime 10*, External Self-Priming Power Filter, 4 pages, admitted prior art, exact date unknown.
*Renaissance Prime 10/20/30*, Self-Priming Canister Filters, 4 pages, admitted prior art, date unknown.
EKIP 250 Thermofilter, Complete Equipment for Aquarium, 7 pages, admitted prior art, date unknown.
*Renaissance* Bravo 120/200/300, Power Filter System., 6 pages, admitted prior art, date unknown.
Tetra/Second nature, Three-Way Filtration-One Healthy Aquarium, 2 pages, admitted prior art, date unknown.
Photo of Filter Cartridges, admitted prior art, date unknown.

* cited by examiner

*Primary Examiner*—Fred Prince
(74) *Attorney, Agent, or Firm*—Merchant & Gould P.C.

(57) ABSTRACT

A filter cartridge including a filtering body. The filtering body having a non-horizontal or rounded bottom edge that aids in draining water from the filter cartridge during filter maintenance.

21 Claims, 12 Drawing Sheets

FILTER CARTRIDGE

FIELD OF THE INVENTION

This disclosure relates to methods and devices for use in water filter systems. More specifically, this disclosure relates to methods and devices for use in aquarium filter systems.

BACKGROUND OF THE INVENTION

To maintain an ecological balance within an aquarium, it is necessary to clean the aquarium water. Cleaning is often accomplished by pumping water from the aquarium to a filter housing, filtering the water through a filter cartridge, and returning the filtered water to the aquarium.

Some filter cartridges are disposable, replaceable items used for convenience in maintaining the aquarium environment. Through normal use of the cartridge, various trapped particulates can gradually slow or block the passage of water through the cartridge. The cartridge eventually reaches an end of life condition. Maintaining an aquarium requires the user to periodically remove and replace the filter cartridge.

In use, the filter cartridge is submerged within aquarium water and is therefore saturated with water when initially removed from the filter housing. A user typically holds the filter cartridge over the aquarium for a period of time while the water drains from the cartridge; and then attempts to dispose of the filter cartridge without dripping water on electrical components or other items or articles that can be damaged or stained from the water. Often times, even after draining the filter cartridge for an extended period of time, the filter cartridge still retains an amount of water that can drip onto the floor or other items as the cartridge is being transported for disposal.

In general, improvement has been sought with respect to such filter cartridge arrangements, generally to accommodate ease-of-use and convenience for the user.

SUMMARY OF THE INVENTION

The present disclosure relates to a filter cartridge for use in an aquarium filter. The filter cartridge has a rounded bottom edge that allows the filter cartridge to more quickly and thoroughly drain so as to more effectively reduce the amount of retained water in the filter cartridge during filter maintenance. This feature improves the ease-of-use and convenience for the user by reducing the time needed to maintain an aquarium and/or by reducing the mess associated with such maintenance.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
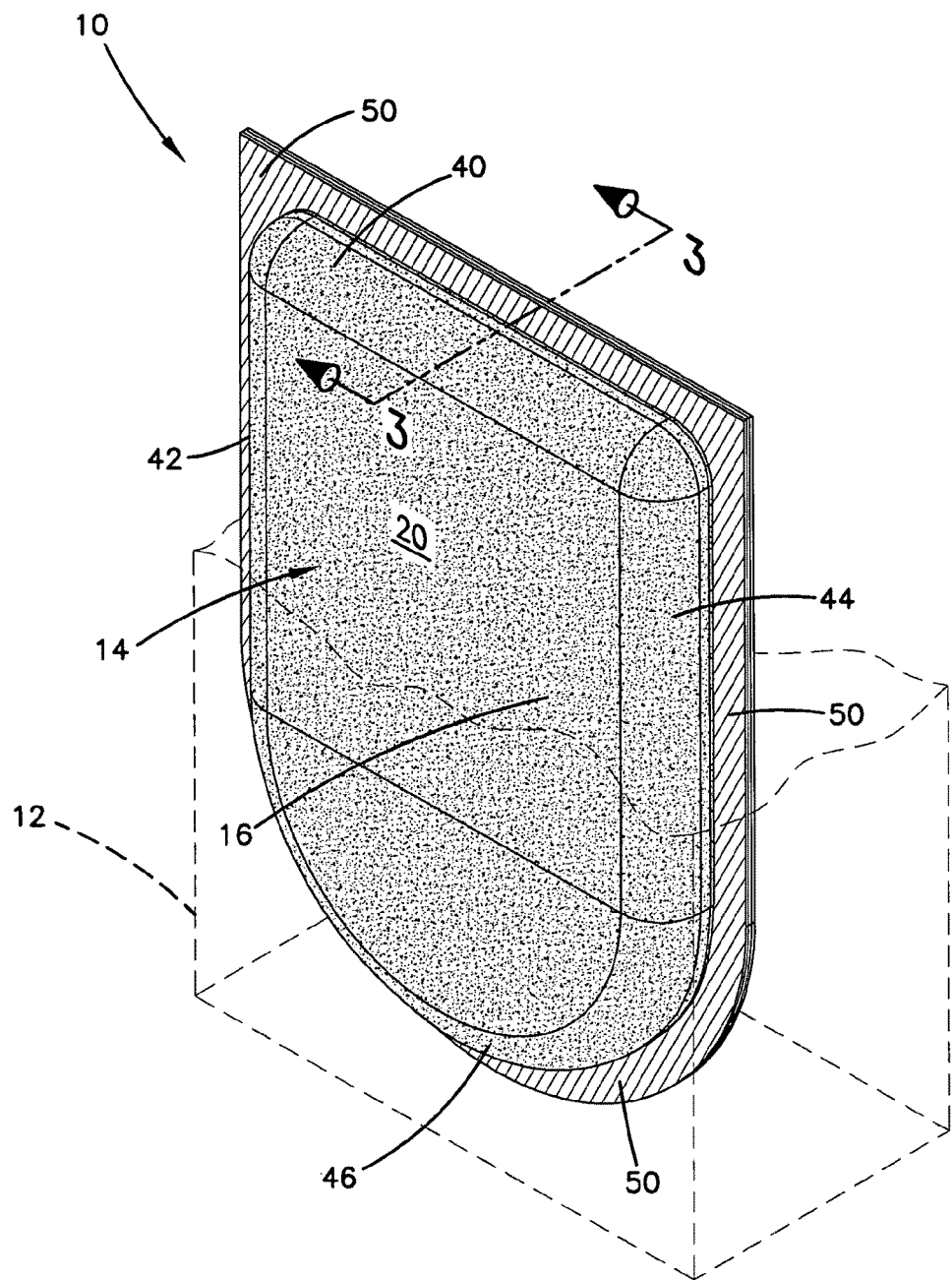
FIG. 1 is a front perspective view of one embodiment of a filter cartridge, in accordance with the principles of the present disclosure.

FIG. 1 illustrates one embodiment of a filter cartridge 10 in accordance with the principles disclosed. The filter cartridge 10 is designed for use in an aquarium filter 12 (schematically represented). The filter cartridge 10 however can be used in other application, such as in pond filters, for example, in accordance with the principles disclosed.

Figure 2:
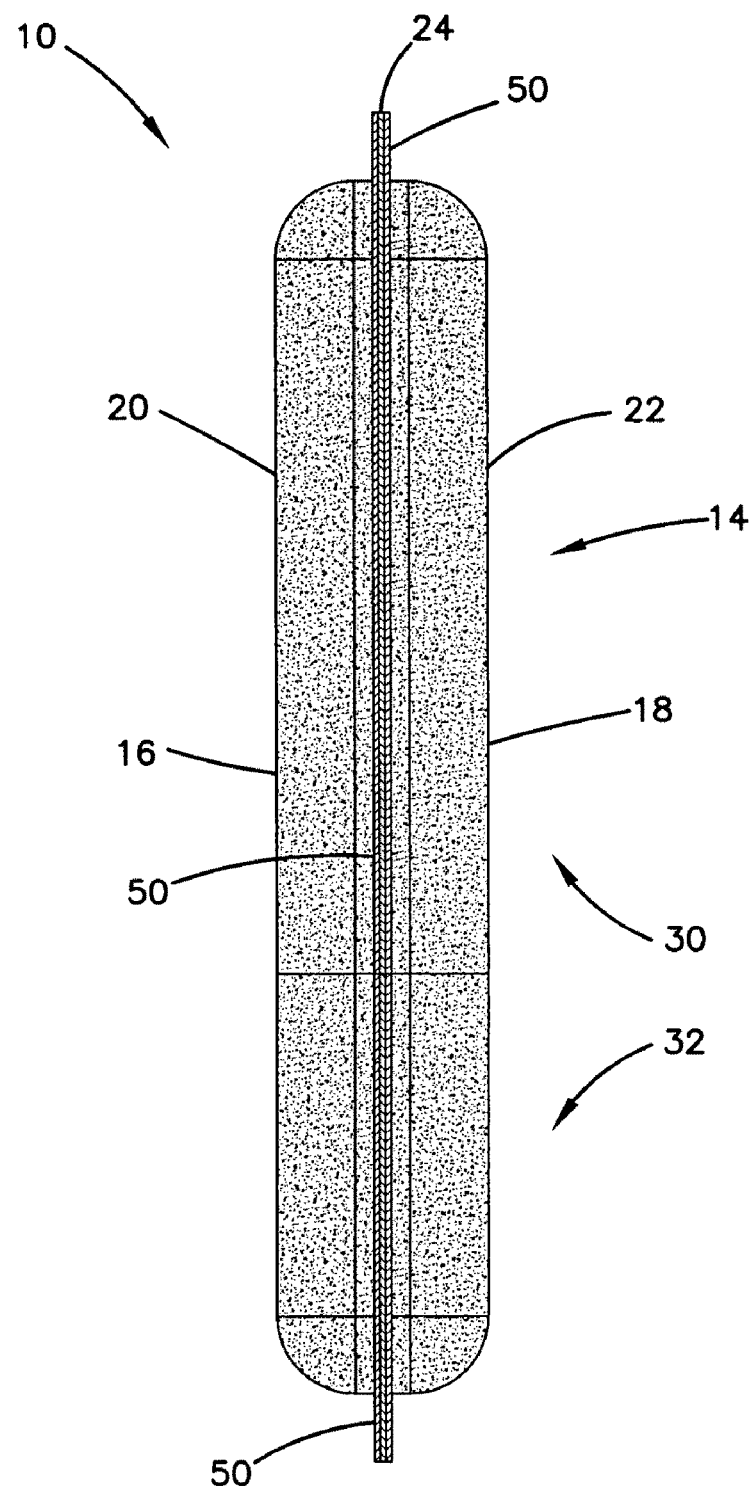
FIG. 2 is a side elevation view of the filter cartridge of FIG. 1.

Referring to FIGS. 1 and 2, the filter cartridge 10 includes a filtering body 14 having first and second opposing sides 16, 18. In use, one of the first and second opposing sides 16, 18 is a water inflow side, while the other of the sides is a water outflow side; depending upon how the user orients the filter cartridge 10 in the aquarium filter 12. In FIG. 1, the filter cartridge 10 is positioned in a vertical orientation when placed within the aquarium filter 12; however, in alternative applications, the filter cartridge can be positioned in non-vertical orientations as well.

Figure 3:
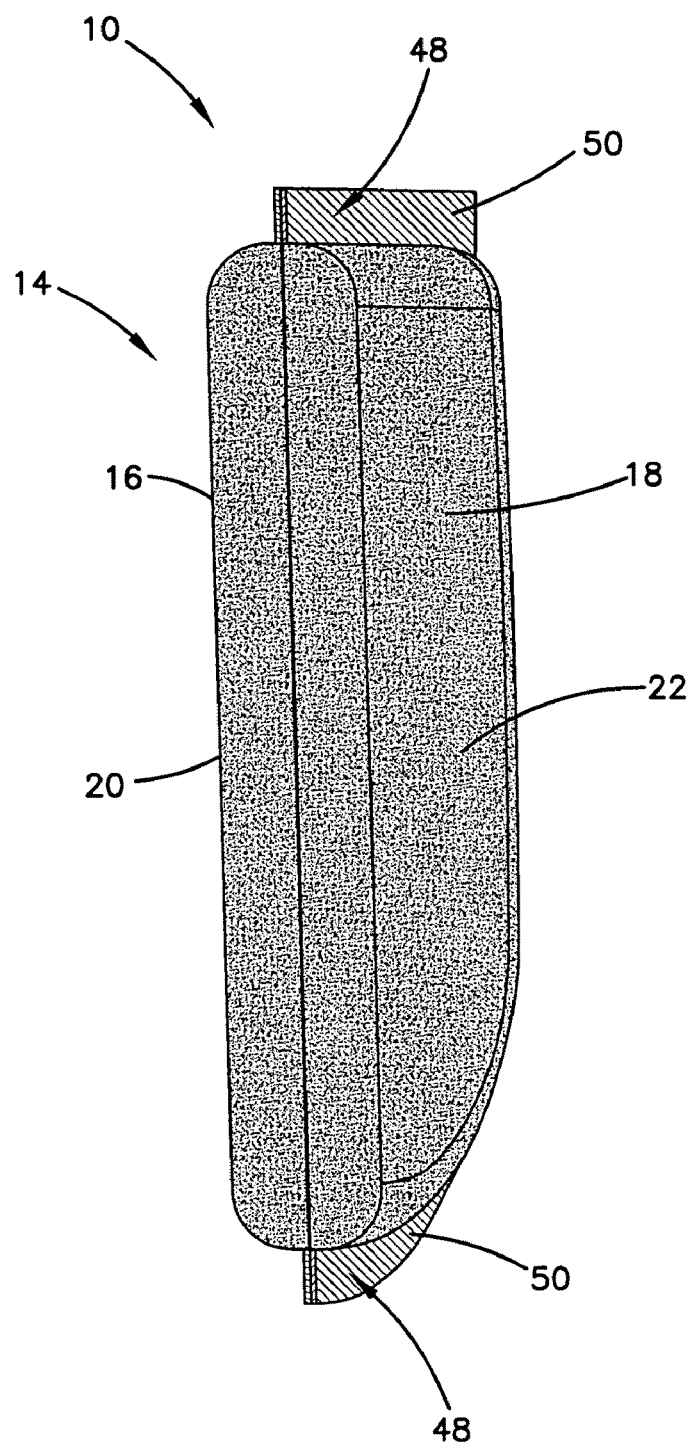
FIG. 3 is a cross-sectional, perspective view of the filter cartridge of FIG. 1, taken along line 3-3, and illustrated without an optional support structure.

Referring now to FIGS. 2 and 3, the first and second sides 16, 18 of the filtering body 14 of the present filter cartridge 10 are defined by first and second porous filter walls 20, 22. The first and second porous filter walls 20, 22 can be of the same material and density; or made of different materials and/or densities. Further details of filter walls having different materials/densities, which can be incorporated in the present filter cartridge, are described in U.S. Pat. No. 6,692,637; U.S. Pat. No. 6,692,637 being incorporated herein by reference.

The first and second porous filter walls 20, 22 of the filter cartridge 10 are secured to one another to define the filtering body 14. In particular, flange regions 48 of the walls 20, 22 are processed to form a sealed flange 50 that extends along the perimeter of the filtering body 14 (see FIG. 1). In one method, the flange regions 48 of the walls are bonded to one another by an ultrasonic welder. In another method, the flange regions of the walls can be bonded to one another by a heat-press process.

Figure 4:
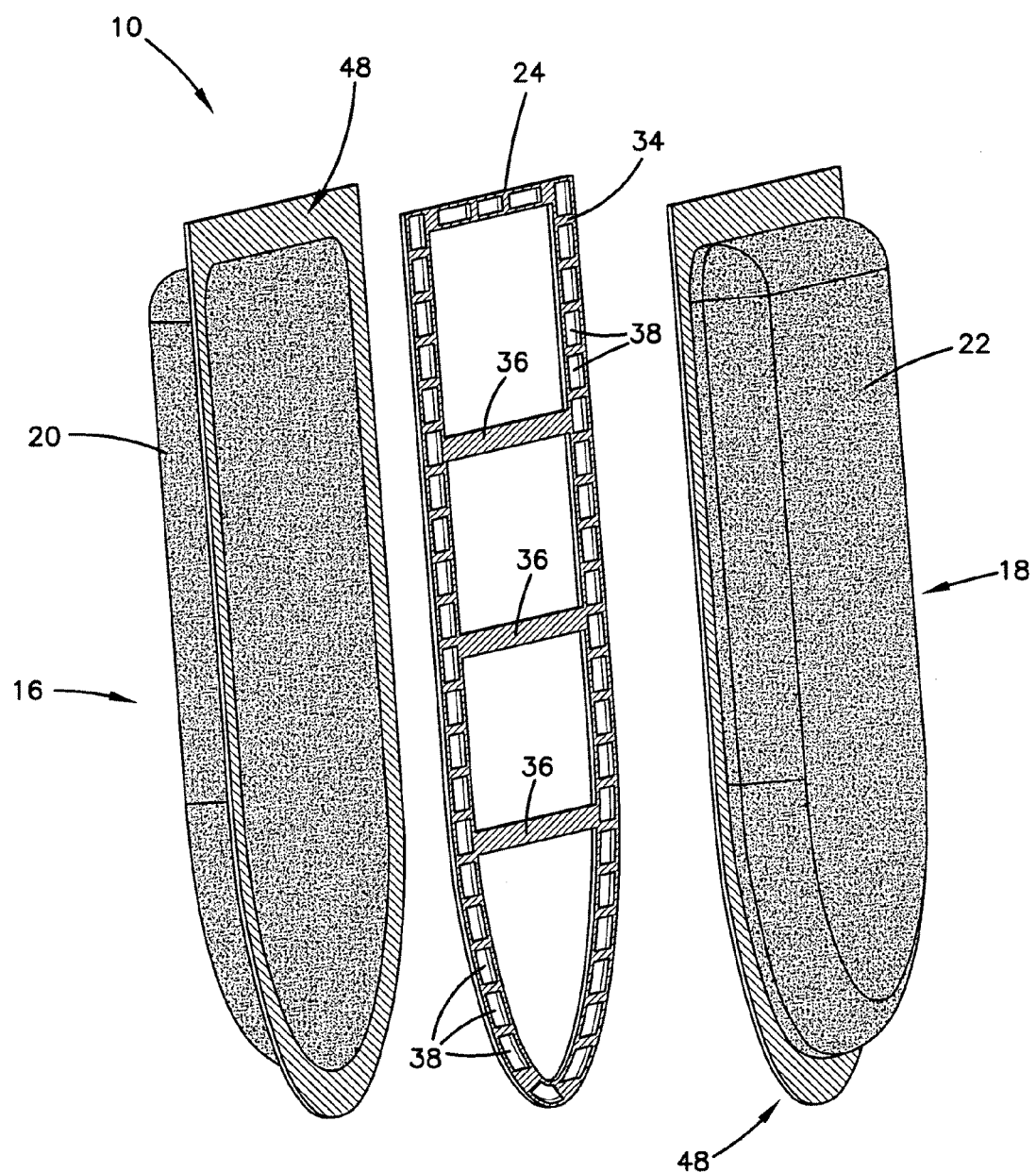
FIG. 4 is an exploded perspective view of the filter cartridge of FIG. 1.

In the embodiment illustrated in FIG. 3, the filtering body 14 is made up of only the first and second porous walls 20, 22. In another embodiment, as illustrated in FIGS. 1, 2 and 4, an optional support structure 24 can be positioned between the first and second porous filter walls 20, 22. The support structure 24 can be provided for additional structural reinforcement; and/or to space the porous filter walls 20, 22 apart from one another in applications where a spaced arrangement is desired. In other applications, the support structure can be provided and configured to distribute and reduce the displacement of activated carbon contained within the filtering body.

Referring to FIG. 4, in the illustrated embodiment, the optional support structure 24 has an outer frame portion 34 that defines an outer frame perimeter. Cross supports 36 can be provided for added structure stability. As can be understood, a variety of frame configurations can be used to provide additional structural reinforcement and/or to space the walls of the filtering body.

In one embodiment, the outer frame portion 34 of the structure 24 has openings 38; or, in the alternative, can be made of a mesh-like material. The openings 38 are provided in a corresponding relationship to the flange regions 48 of the first and second porous walls 20, 22. In particular, the openings 38 are arranged to permit the first and second porous walls 20, 22 to contact one another so that when the flange regions 48 of the walls 20, 22 are welded or heat-pressed, the walls can bond to one another through the openings 38.

In an alternative embodiment, the flange regions 48 of the walls 48 can be attached directly to the outer frame portion 34 of the support structure 24, as opposed to the opposing wall. Another alternative embodiment can include a support structure that is also compressed and formed by a heat pressure process. In still other embodiments, the support structure can simply be inserted within an interior of the filtering body 14, the filtering body 14 being attached to the support structure by retaining clips or fasteners, for example.

Figure 5:
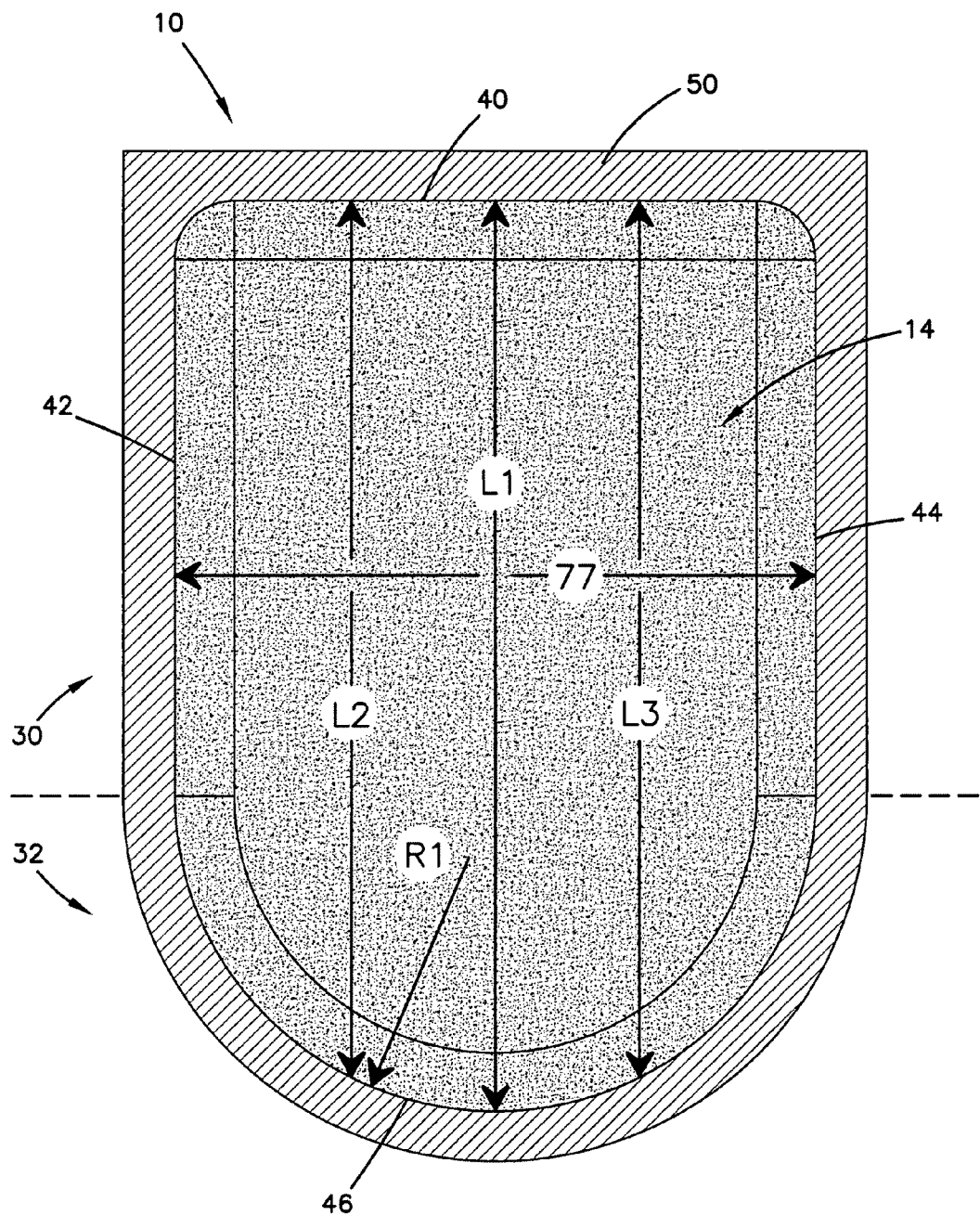
FIG. 5 is a front elevation view of the filter cartridge of FIG. 1.

Referring now to FIG. 5, the filter cartridge 10 of the present disclosure defines a primary upper region 30 and a secondary lower region 32. The primary upper region 30 has a generally square or rectangular shape. The primary upper region 30 is typically greater in surface area than the lower region 32 of the filter cartridge. In the illustrated embodiment, the lower region 32 has a half-circle shape. The lower region 32 can be made to have other shapes, as is described in greater detail hereinafter, and in accordance with the principles disclosed.

The primary upper region 30 of the filter cartridge 10 is defined by a top edge 40 and opposing side edges 42, 44. The top edge 40 extends between the opposing side edges 42, 44. The edges 40, 42, 44 are the edges or seams at which the un-pressed porous filtering media of the filtering body join. The flange 50 of the filtering body 14 (e.g., the radial length of the seams) is generally not considered to be filtering media in this particular definition, as the flange is not typically porous so as to be water permeable or water filtering.

The top edge 40 of the filtering body 14 is linear. When the filter cartridge 10 is positioned within the aquarium filter 12, the top linear edge 40 is a generally horizontal top edge; while the opposing side edges 42, 44 are generally vertical. The secondary lower region of the filter cartridge 10 is defined by a bottom edge 46. The bottom edge 46 extends between the opposing vertical side edges 42, 44.

Referring back to FIG. 1, as described, the top edge 40 of the filtering body is generally horizontal when the filter cartridge 10 is positioned within the aquarium filter 12. A majority of the bottom edge 46 extending between the opposing side edges 42, 44 is non-horizontal when the filter cartridge 10 is positioned within the aquarium filter 12. As will be discussed in greater detail hereinafter, the substantially non-horizontal bottom edge 46 of the filter cartridge 10 allows the filter cartridge to more quickly and completely drain during maintenance so as to more effectively reduce the amount of retained water during replacement of the filter cartridge. In the embodiment of FIGS. 1-5, the substantially non-horizontal bottom edge 46 is a rounded bottom edge.

Referring again to FIG. 5, the filtering body 14 of the filter cartridge 10 has a central longitudinal dimension L1 and a central transverse dimension T1. The central longitudinal dimension L1 is centrally located between the opposing side edges 42, 44; and extends from the top edge 40 to the bottom edge 46 of the filtering body 14. The central transverse dimension T1 of the filtering body 14 is centrally located between the top edge 40 and the bottom edge 46; and extends from one side edge 42 to the other side edge 44. The filtering body 14 further has lateral longitudinal dimensions L2, L3 located on opposite sides of the central longitudinal dimension L1.

In the illustrated embodiment, each of the central longitudinal dimension L1 and the lateral longitudinal dimensions L2 and L3 is greater than the central transverse dimension T1. In one embodiment, the central transverse dimension T1 is between about 2 and 7 inches (about 5 and 18 centimeters). The central longitudinal dimension L1 is between about 4 and 10 inches (about 10 and 25 centimeters). In the embodiment of FIGS. 1-5, the central longitudinal dimension L1 is the greatest of all longitudinal dimension of the filtering body 14.

Still referring to FIG. 5, the rounded bottom edge 46 of the filter cartridge 10 forms a convex curvature that extends between the opposing side edges 42, 44 of the filtering body 14. The rounded bottom edge 46 is defined by a radius R1. In one embodiment, the radius R1 is approximately equal to one-half a distance extending between the opposing side edges 42, 44 (i.e., one-half the transverse dimension T1). In the illustrated embodiment of FIGS. 1-5, the radius is approximately 2.2 inches (approximately 5.6 centimeters). The rounded bottom edge 46 of the filter cartridge 10 allows the filter cartridge to more quickly and completely drain so as to more effectively reduce the amount of retained water during replacement of the filter cartridge. Other non-horizontal bottom edges, however, can also be employed to effectively reduce the amount of retained water during replacement of the filter cartridge.

Figure 6:
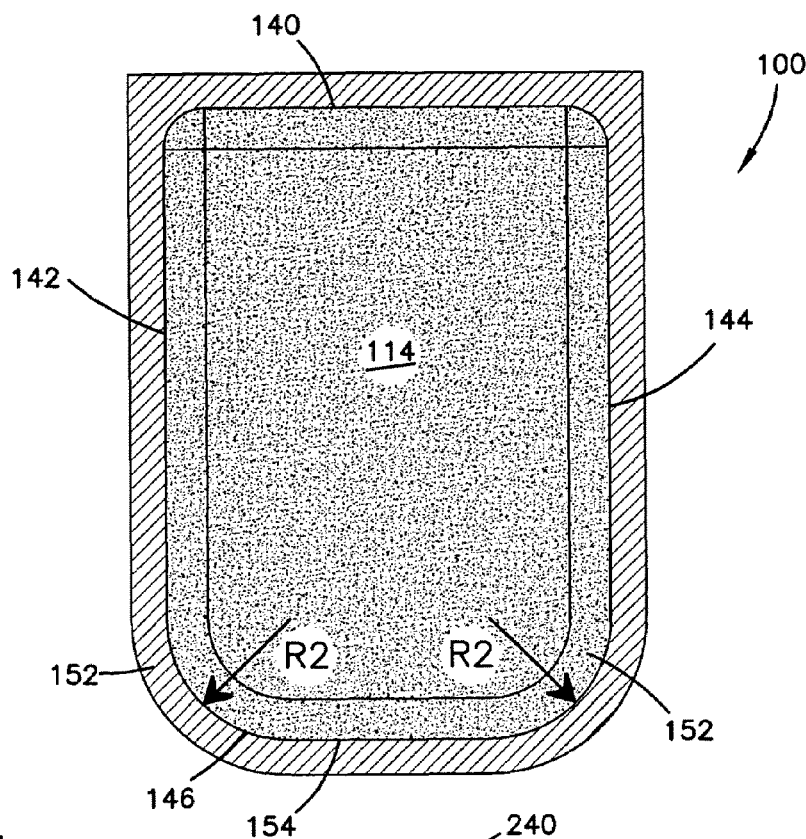
FIG. 6 is a front elevation view of another embodiment of a filter cartridge, in accordance with the principles of the present disclosure.

For example, referring now to FIG. 6, an alternative embodiment of a filter cartridge 100 is illustrated. The filter cartridge 100 includes a filtering body 114 having a top edge 140, a bottom edge 146 and opposing side edges 142, 144.

The filter cartridge 100 of FIG. 6 is similar to that of the previous embodiment with the exception of the configuration of the bottom edge 146. In this embodiment, the bottom edge 146 includes chamfered or rounded corners 152. In particular, the corners are rounded corners 152 having a radius R2 of between about 0.7 and 1.5 inches (about 1.8 and 3.8 centimeters). In the illustrated embodiment, the radius is approximately 1.25 inches (approximately 3.2 centimeters). As shown in FIG. 6, only a portion 154 of the bottom edge 146 is horizontal. A significant portion (at least one-third) of the bottom edge 146 that extends between the vertical opposing sides 142, 144 is non-horizontal (e.g., curved).

Figure 7:
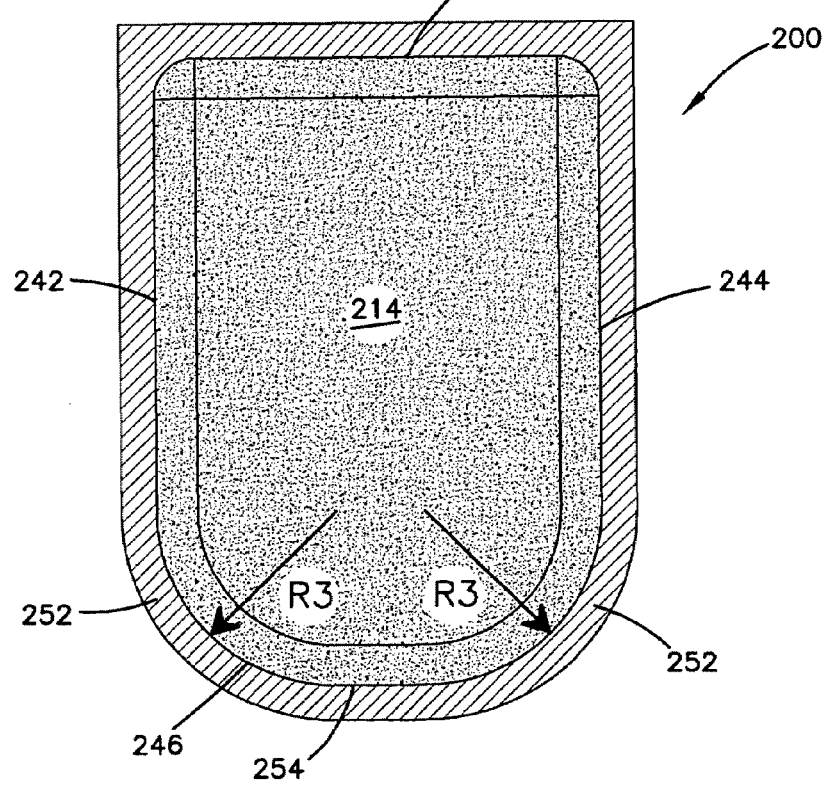
FIG. 7 is a front elevation view of yet another embodiment of a filter cartridge, in accordance with the principles of the present disclosure.

Referring now to FIG. 7, yet another alternative embodiment of a filter cartridge 200 is illustrated. The filter cartridge 200 includes a filtering body 214 having a top edge 240, a bottom edge 246 and opposing side edges 242, 244. In this embodiment, the bottom edge 246 includes larger chamfered or rounded corners 252 than that of the previous filter cartridge 100 of FIG. 6. In particular, the corners are larger rounded corners 252 can have a radius R3 of between about 1.5 and 2.2 inches (about 3.8 and 5.6 centimeters). In the illustrated embodiment, the radius is approximately 1.75 inches (approximately 4.4 centimeters). Similar to the previous embodiment, only a portion 254 of the bottom edge 246 is horizontal. In this embodiment, a majority (at least 50%) of the bottom edge 146 that extends between the vertical opposing sides 242, 244 is non-horizontal when the filter cartridge is positioned within an aquarium filter.

It is to be understood that the particular radius ranges specified for the embodiments of FIGS. 6 and 7 are relative to the transverse width of the filtering body. Wider filtering bodies can have larger maximum and minimum radii, while narrower filers can have smaller maximum and minimum radii.

Figure 8:
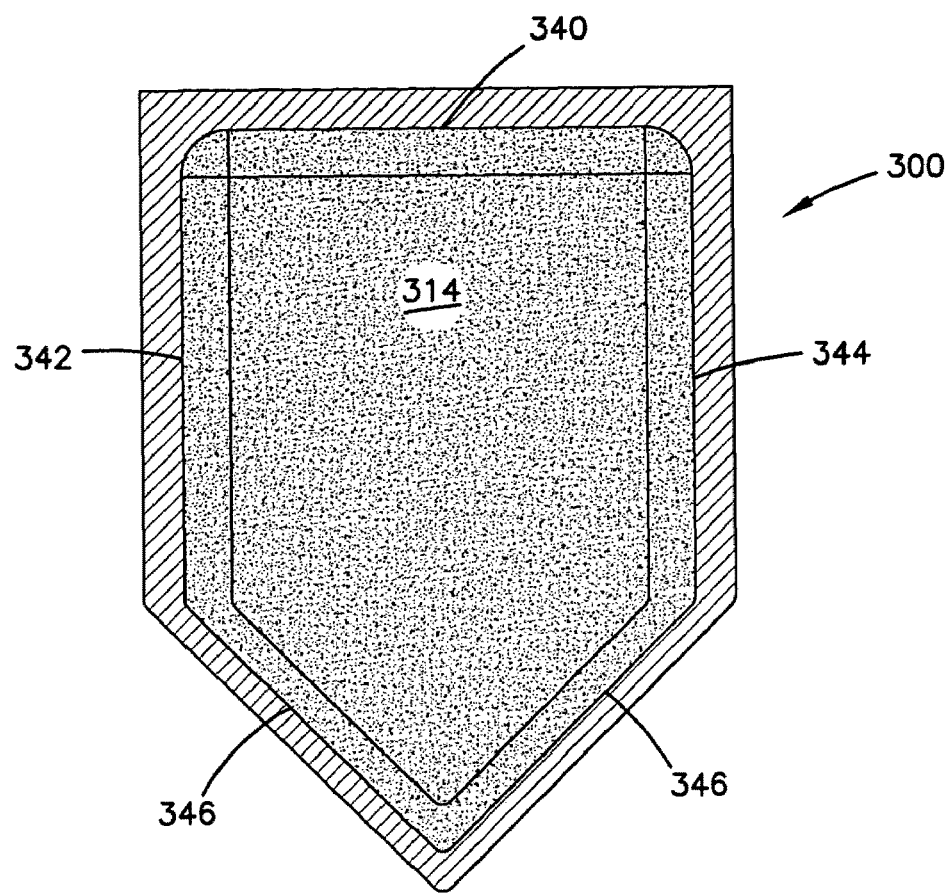
FIG. 8 is a front elevation view of still another embodiment of a filter cartridge, in accordance with the principles of the present disclosure.
Figure 9:
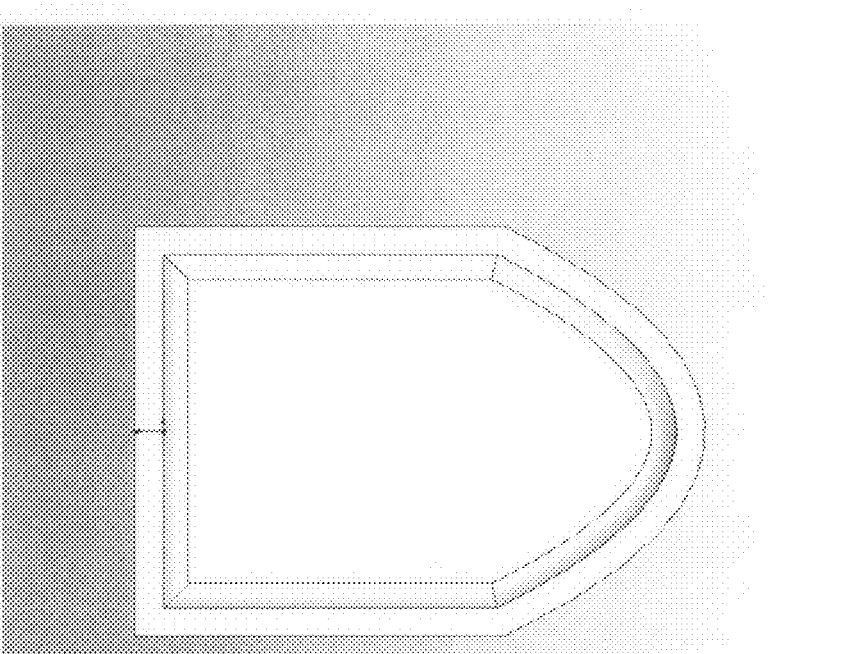
FIGS. 9-17 are front elevation views of yet other embodiments of filter cartridges, in accordance with the principles of the present disclosure.
Figure 10:
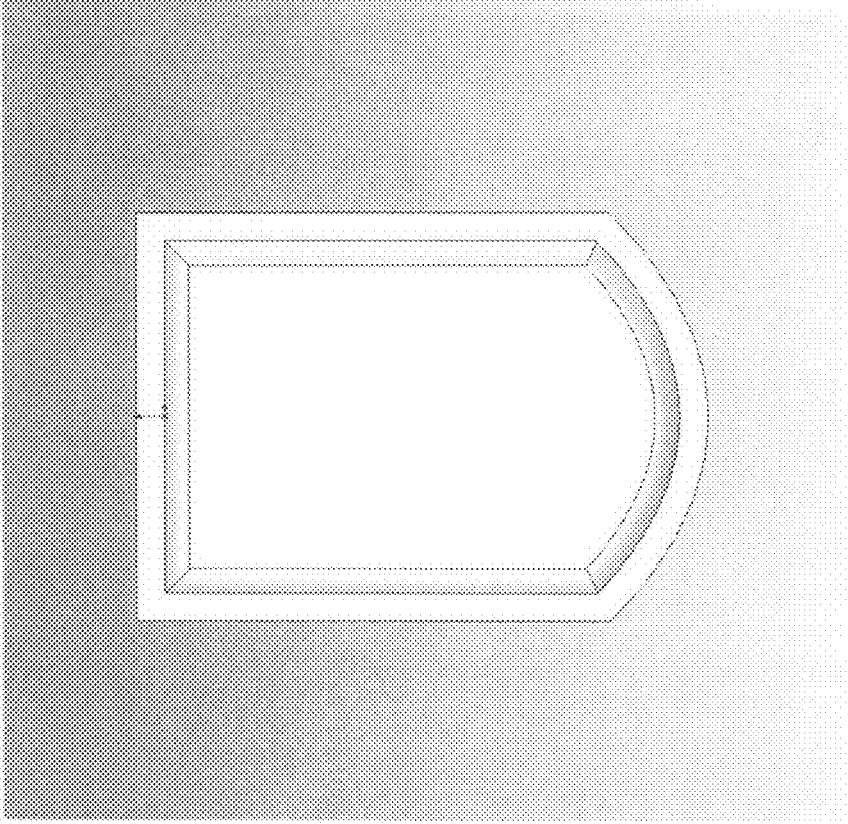
Figure 11:
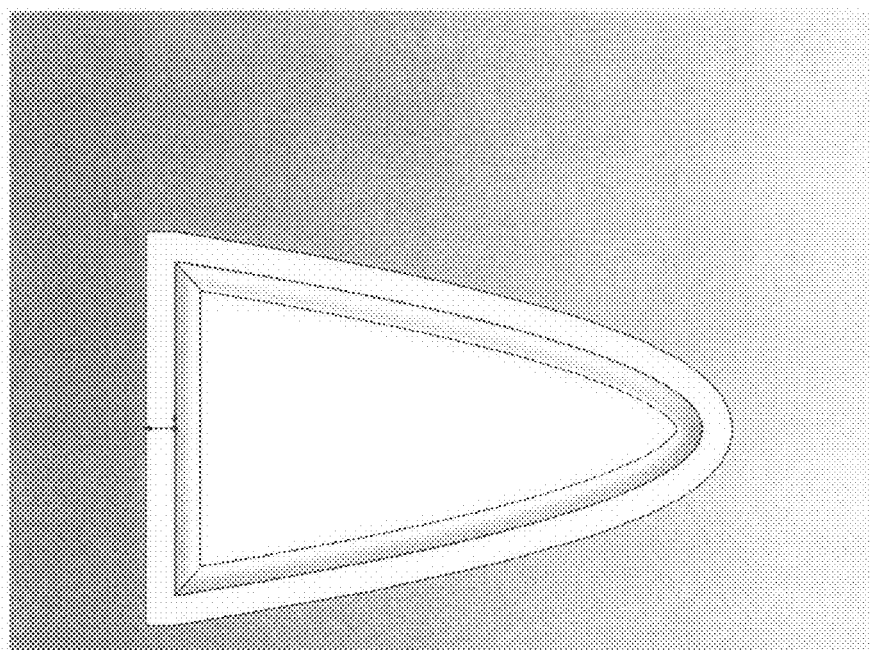
Figure 12:
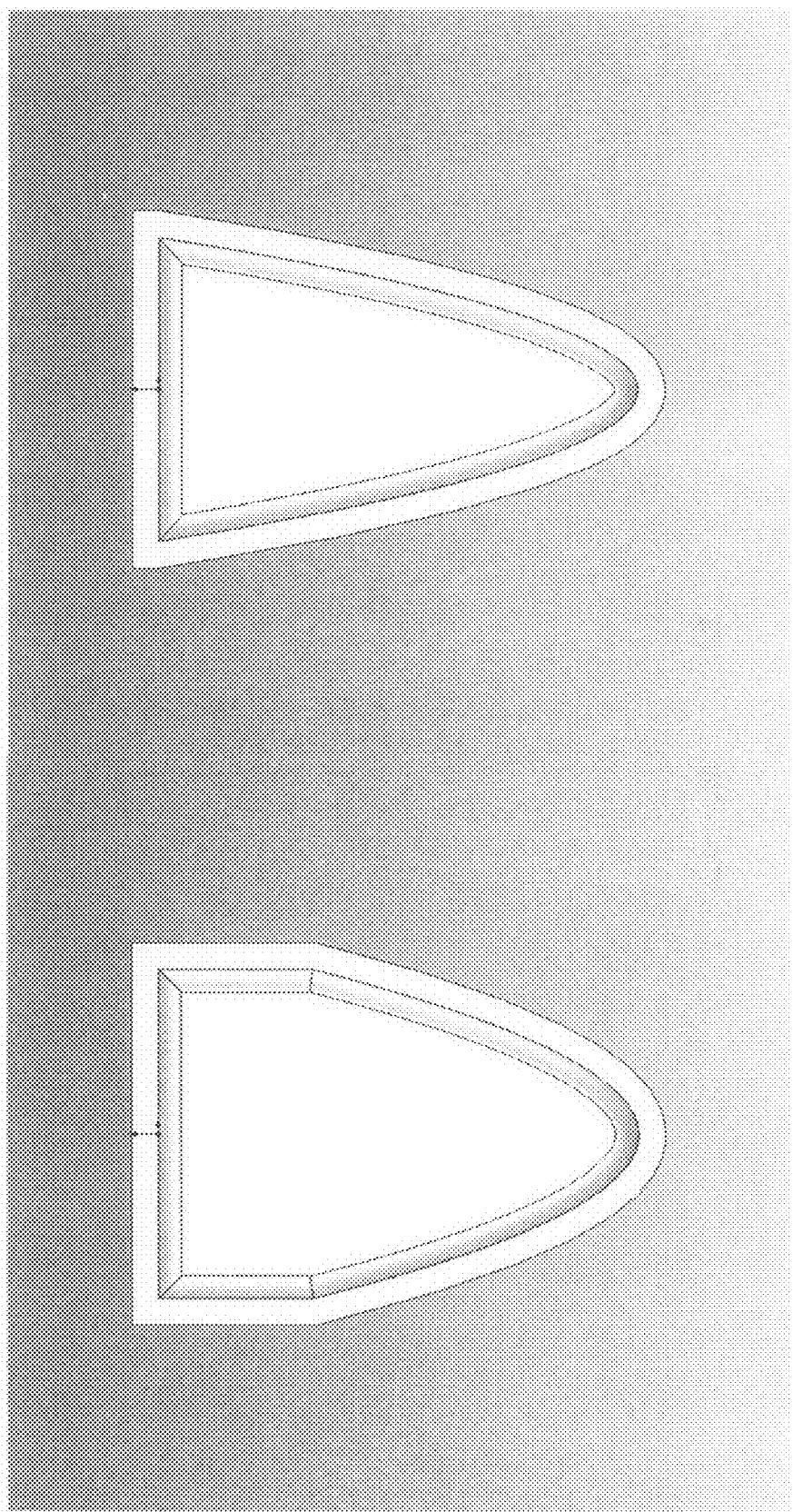
Figures 13, 14:
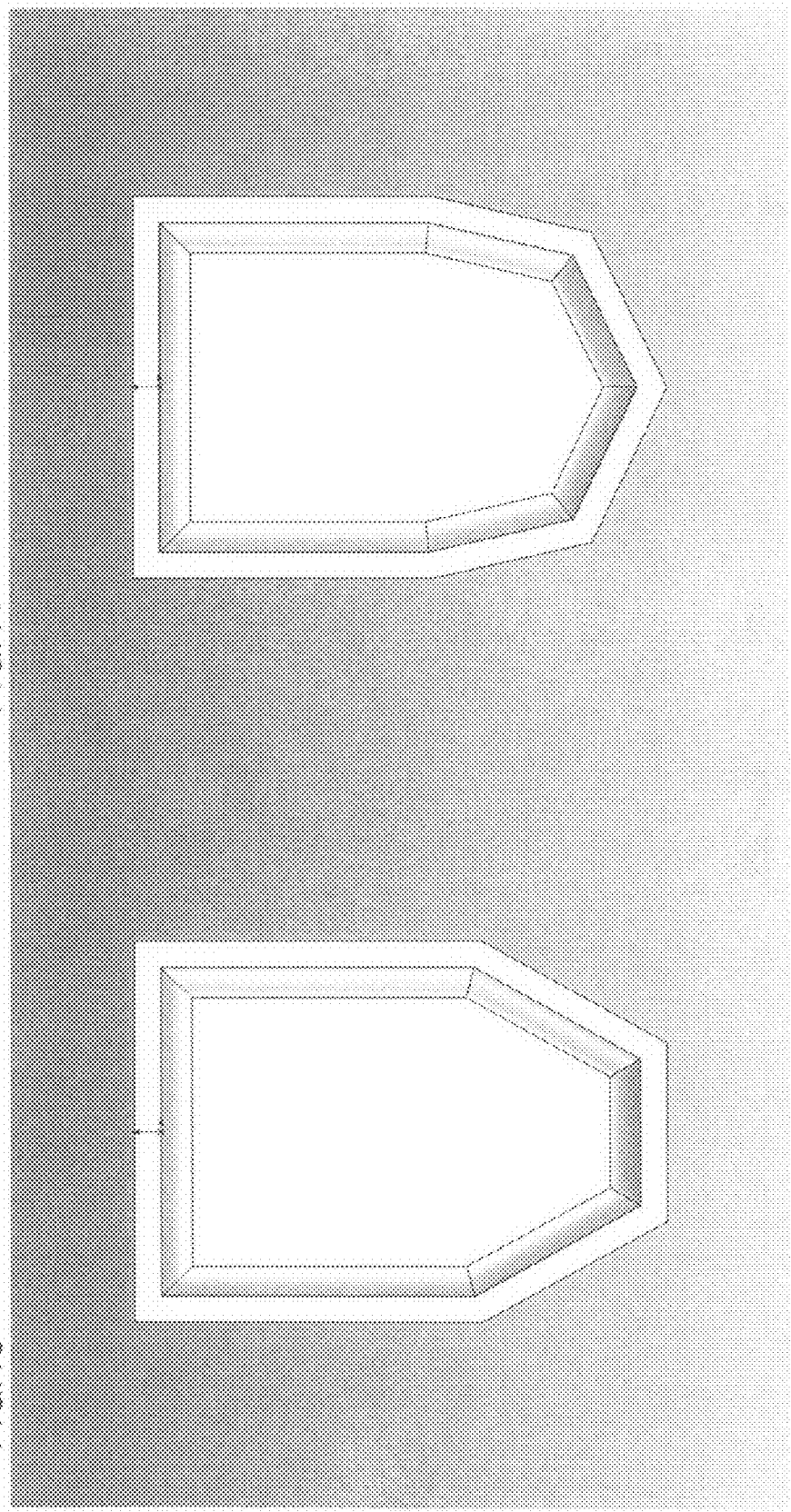
Figure 15:
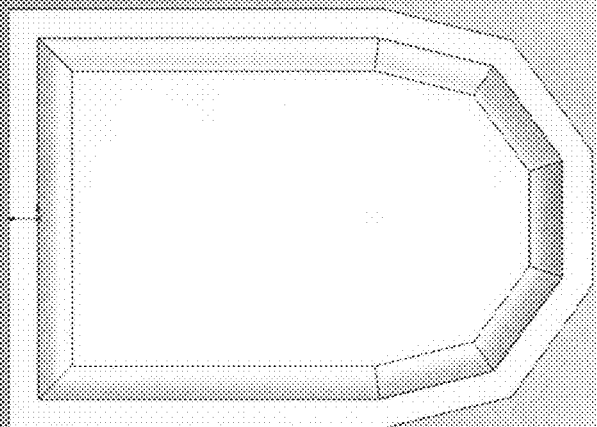
Figure 16:
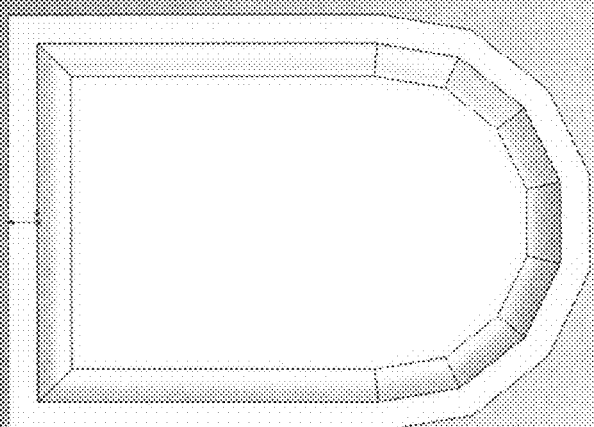

Referring now to FIG. 8, still another alternative embodiment of a filter cartridge 300 is illustrated. The filter cartridge includes a filtering body 314 having a top edge 340, opposing bottom edge portions 346, and opposing side edges 342, 344. The filter cartridge 300 of FIG. 8 is similar to that of the previous embodiments with the exception of the configuration of the bottom edge portions 346. In this embodiment, the bottom edge portions 346 are linear and angled (non-perpendicular) relative to the side edges 342, 344; in particular, the illustrated bottom edges portions 346 are angled inward at approximately 135 degrees relative to the side edges.

Figure 18:
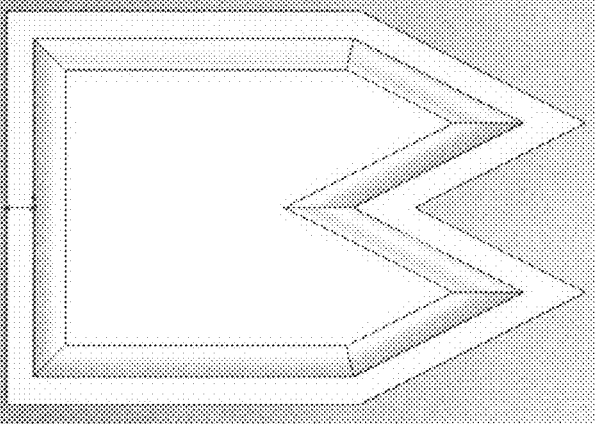
FIG. 18 is a front elevation view of another embodiment of a filter cartridge, in accordance with the principles of the present disclosure.
Figure 17:
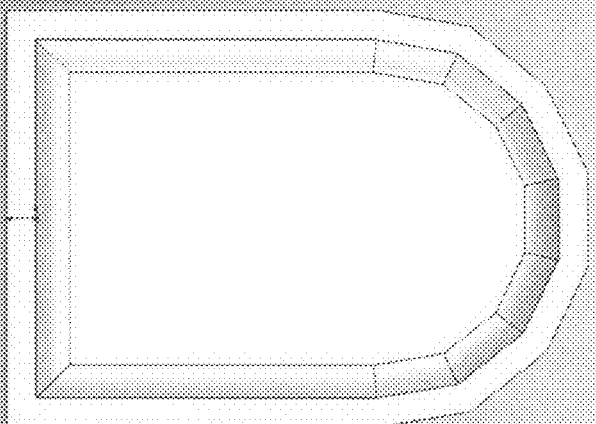

As will be understood, filter cartridges having other bottom edge shapes can also be used in accordance with the principles disclosed. Such other shapes can include an elliptical, parabolic, or hyperbolic shape (see, for example, FIGS. 9-12), other non-horizontal edge shapes formed by a series of straight line segments (see, for example, FIGS. 13-17), or shapes having both convex and concave portions (see, for example, FIG. 18).

In each of the filter cartridge embodiments, a significant portion (at least one-third) of each bottom edge 46, 146, 246, 346 of the filter cartridges is non-horizontal, or non-parallel relative to the top edge of the filter cartridge. In particular, a significant portion of the bottom edge of each filter cartridge 10, 100, 200, 300 is non-horizontal when the cartridge is positioned within an aquarium filter in a vertical orientation. Each of the embodiments more quickly and effectively drains water than that of conventional filter cartridge arrangements. In the following Table A, test results of a study show the improvement of water drainage of the various filter cartridges presently disclosed.

In particular, Table A provides test results of a study of the water retention characteristics of various filter cartridges. The study included testing of a conventional filter cartridge having a square, primarily horizontal bottom edge, and testing of the various filter cartridge embodiments disclosed having bottom edges with portions that are non-horizontal.

For background purposes, squared-off bottom edges are common so as to maximize the surface area or effective filtering area of the cartridge. However, conventional filter cartridges maintained in a normal vertical orientation during draining retain a particular amount or proportion water, despite the amount of time allotted for drainage. In other words, even if a user patiently waits for a conventional filter cartridge to drain, complete drainage may not be attained due to the particular water retention characteristics of the filter cartridge.

It has been determined that the particular water retention characteristics of a filter cartridge are partly due to the material which makes up the filter cartridge, and partly due to the construction of the filter cartridge. That is, the nature of non-woven fabric and the characteristics of a seamed cartridge (i.e. a cartridge having first and second seamed or joined walls) tend to retain water due to the cohesive and adhesive nature of water. The water retention characteristics of filter cartridges can often be greater than the force of gravity that attempts to drain the cartridge.

In conducting the present study, an ultrasonic welder was used to form filter cartridge samples A-E, each having a bottom edge as shown in column 2 of Table A. Sample A was representative of a conventional filter cartridge having a linear or squared-off bottom edge. Sample B was representative of the filter cartridge embodiment of FIG. 6 having rounded corners. Sample C was representative of the filter cartridge embodiment of FIGS. 1-5 having a fully rounded bottom edge. Sample D was representative of the filter cartridge embodiment of FIG. 7 having larger rounded corners. Sample E was representative of the filter cartridge embodiment of FIG. 8 in which the bottom edge is angled but not perpendicular to the side seams. (None of the filtering bodies of the filter cartridge samples included a support structure (e.g., 24).)

Each of the samples was soaked in water for a predetermined period of time. In particular, each of the samples was placed in an aquarium filled with water until all air was evacuated from the filtering body 14 of the sample. Each sample was then lifted vertically out of the tank, held stationary in a vertical position, and allowed to drain for a predetermined period of time. The predetermined period of time was the period of time considered to be reasonable for a consumer to wait for the cartridge to drain. In the present study, the predetermined drainage period was 15 seconds.

The water remaining within the samples was then collected by rotating the filtering body 14 sample in a pendulum motion such that the front and rear faces of the sample always remained parallel to a vertical axis. The collected water was then measured. Three tests were conducted for each sample. As shown in Table A, the conventional filter cartridge having a square or horizontal bottom (Sample A) retained an average of 16.7 grams of water. The disclosed filter cartridge embodiments having substantially non-horizontal bottom edges (samples B-E) retained an average amount of water significantly less than that of the conventional filter cartridge.

TABLE A

Evaluation of Water Retention by Cartridge Type

| Cartridge ID | Shape | Description | Mass of Water Retained(g) | Average (g) |
|---|---|---|---|---|
| A |  | Standard | 16.5<br>16.4<br>17.2 | 16.7 |
| B |  | Small chamfer | 6.7<br>9.4<br>10.3 | 8.8 |
| C | 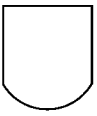 | Full Round | 4.1<br>3.8<br>3.8 | 3.9 |
| D |  | Large chamfer | 8.6<br>9.3<br>9.3 | 9.1 |
| E | 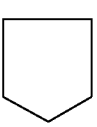 | Chevron | 8.9<br>9.7<br>10.3 | 9.6 |

The test data shows that a non-horizontal bottom edge or seam greatly enhances the drainage of water from a filter cartridge as compared to conventional squared-off seams. In particular, as a saturated filter cartridge is removed from the aquarium filter 12, the force of gravity causes water to flow down the filtering material towards the bottom edge or seam that defines the lower region of the filter cartridge. If the bottom seam is horizontal or square, head or drainage pressure from the water is equally distributed; the equal distribution of water in essence lessens the head pressure such that water is retained by the filtering body. In the alternative, if the bottom seam is angled or rounded, the water flow follows the angled or rounded seam downwards effectively increasing head or drainage pressure at the bottom-most region of the filtering body; all the head pressure from the water that would have been normally retained by a broad horizontal bottom is instead concentrated into a smaller volume, causing the filter cartridge to drain more quickly and completely.

While some water is still retained by the present filter cartridges, the amount or proportion of water retained is significantly reduced. As shown in the above test results, conventional filter cartridges having a squared-off bottom edge retain upwards of 4 times the amount of water as that of the present filter cartridge having a fully rounded bottom edge. The non-horizontal bottom edges of the disclosed filter cartridge embodiments improve drainage performance and reduce the mess associated with filter maintenance.

The above specification provides a complete description of the present invention. Since many embodiments of the invention can be made without departing from the spirit and scope of the invention, certain aspects of the invention reside in the claims hereinafter appended.

What is claimed is:

1. A filter cartridge for use in an aquarium filter, the filter cartridge comprising:
a filtering body including a first porous wall and a second porous wall, the first porous wall defining a water inflow side of the filter cartridge, the second porous wall defining a water outflow side of the filter cartridge, the filtering body having a top edge, a bottom edge, and opposing side edges, each of the top and bottom edges extending between the opposing side edges;
wherein at least one-third of the bottom edge extending between the opposing side edges is rounded.

2. The filter cartridge of claim 1, wherein the top edge is a generally horizontal top edge when the filter cartridge is positioned within an aquarium filter.

3. The filter cartridge of claim 1, wherein at least 50 percent of the bottom edge of the filtering body is rounded.

4. The filter cartridge of claim 1, wherein the filtering body has a primary upper region that is greater in surface area than a secondary lower region, the primary upper region having a generally rectangular shape, the secondary lower region having a half-circle shape.

5. The filter cartridge of claim 1, wherein the rounded bottom edge is defined by a radius, the radius being equal to approximately one-half of a distance between the opposing side edges.

6. The filter cartridge of claim 5, wherein the radius is approximately 2.2 inches.

7. The filter cartridge of claim 1, further including a support structure positioned between the first and second porous filter walls.

8. The filter cartridge of claim 1, wherein the filtering body defines a central longitudinal dimension extending between the top and bottom edges, lateral longitudinal dimensions extending between the top and bottom edges, and a central transverse dimension extending between the side edges, the central longitudinal dimension being greater than the lateral longitudinal dimensions, the central transverse dimension being less than each of the central and lateral longitudinal dimensions.

9. The filter cartridge of claim 1, wherein the first and second porous walls are the only fluid-filtering walls of the filtering body.

10. The filter cartridge of claim 1, wherein each of the first and second porous walls of the filtering body has a perimeter, the perimeters of the first and second porous walls defining a seal that extends around the entire perimeter of the filtering body.

11. The filter cartridge of claim 10, wherein the seal that extends around the entire perimeter of the filtering body is a sealed flange.

12. A filter cartridge for use in an aquarium filter, the filter cartridge comprising:
first and second filter walls defining a filtering body, the first and second filter walls being joined at a top seam and a bottom seam, the top and bottom seams partly defining a seal that extends around the entire perimeter of the filtering body;
wherein the top seam is generally horizontal when the filter cartridge is positioned within the aquarium filter, and wherein at least one-third of the bottom seam is non-horizontal relative to the top seam.

13. The filter cartridge of claim 12, wherein at least 50 percent of the bottom seam of the filtering body is non-horizontal.

14. The filter cartridge of claim 12, wherein the non-horizontal portion of the bottom seam is defined by rounded corners.

15. The filter cartridge of claim 12, wherein the non-horizontal portion of the bottom seam is defined by angled portions of the bottom seam.

16. The filter cartridge of claim 12, wherein the bottom seam is fully rounded.

17. The filter cartridge of claim 12, wherein the filtering body has a primary upper region that is greater in surface area than a secondary lower region, the primary upper region having a generally rectangular shape defined by the top seam and opposing side seams, the secondary lower region being defined by the bottom seam.

18. The filter cartridge of claim 12, further including a support structure positioned between the first and second filter walls.

19. The filter cartridge of claim 12, wherein the filtering body defines a central longitudinal dimension extending between the top and bottom seams, lateral longitudinal dimensions extending between the top and bottom seams, and a central transverse dimension extending between side seams, the central longitudinal dimension being greater than the lateral longitudinal dimensions, the central transverse dimension being less than each of the central and lateral longitudinal dimensions.

20. The filter cartridge of claim 12, wherein the first and second filter walls are the only fluid-filtering walls of the filtering body.

21. The filter cartridge of claim 12, wherein the seal that extends around the entire perimeter of the filtering body is a sealed flange.

* * * * *